Dec. 18, 1934. J. A. BROWNLEE 1,984,726
SELF GRADING DEVICE
Filed April 21, 1932
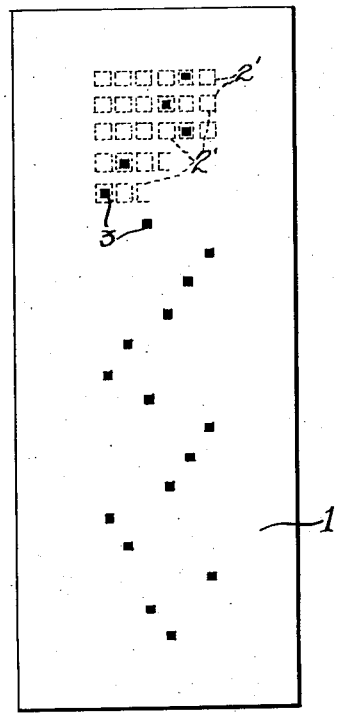
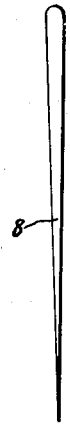
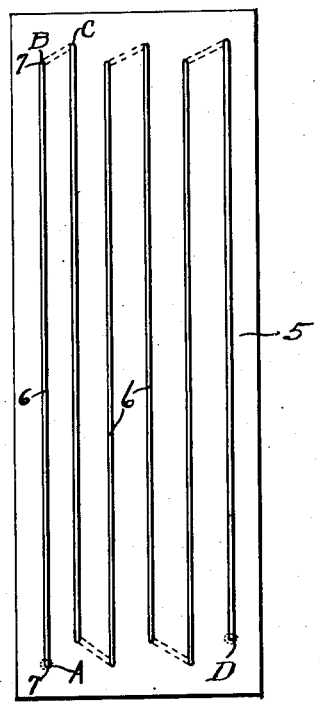
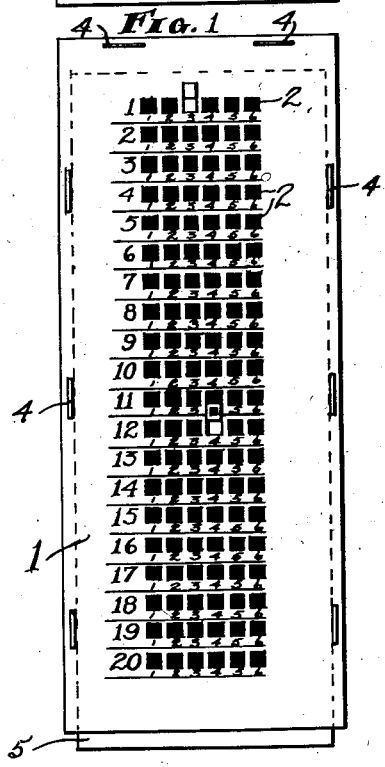
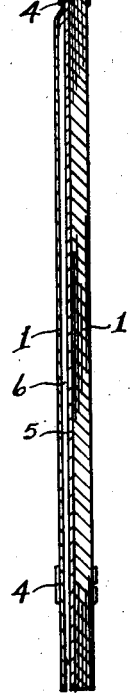
INVENTOR.
John A. Brownlee
BY
ATTORNEY.

Patented Dec. 18, 1934

1,984,726

UNITED STATES PATENT OFFICE 1,984,726

SELF-GRADING DEVICE

John A. Brownlee, Wichita, Kans.

Application April 21, 1932, Serial No. 606,564

5 Claims. (Cl. 35—12)

My invention relates to a self grading device.

The object of my invention is to provide a device adaptable for giving multiple choice tests.

A further object of my invention is to provide a score sheet uniformly checkered on one side, the other side being blank except for indicia on a desired selection of checks in registry concentric thereto, and brought into view from the checkered side by severing part way around the check and turning the same upward.

A still further object of my invention is to provide a panel as supporting means for the score sheet, and means to space the score sheet from the panel as means for aiding the penetration of an instrument to sever the selected check part way around thru the medium of perforations or linear incisions.

A still further object of my invention is to provide a self grading device consisting of a checkered score sheet having checks aligned longitudinally and transversely so that the transverse lines may be numbered consecutively longitudinally of the sheet, and the several checks of each of the transverse lines numbered consecutively, alike as means to select a desired check and to verify the correctness of an answer to a question.

These and other objects will hereinafter be more fully explained, reference being had to the accompanying drawing forming a part of this specification, and in which like characters will apply to like parts in the different views, and in which:—

Fig. 1 is plan view of the checkered score device in use.

Fig. 2 is a longitudinal section of the device before use.

Fig. 3 is a plan view of the reverse side of the checkered score sheet before use.

Fig. 4 is a plan view of the panel supporting means for the score sheet with linear separating means carried thereby.

Fig. 5 is a side view of a pointed instrument.

My invention herein disclosed consists of a score sheet having a plurality of checks 2 aligned longitudinally and transversely on the score sheet. The checks are preferably rectangular in form and colored. Those horizontally aligned are identified by numerals in consecutive order from left to right, and in which a corresponding number of an answer is found, while the vertically aligned rows of checks are identified by numerals in consecutive order beginning at the top row, and in which the corresponding number of a question is found, all of which is illustrated in Fig. 1.

On the opposite side of the score sheet as shown in Fig. 3, indicia 3 are placed concentric to the checks as shown by dotted lines 2' for the purpose later described. The said checkered score sheets 1 and panel 5 are stacked in tablet form and secured together by staples 4 marginally applied along each edge, and one end as shown in Figs. 1 and 2, the lower ends being free to separate for the reception of a panel 5 insertable therebetween, the panel having placed thereon a plurality of cords 6 by threading the same thru apertures 7 positioned at each end of the board. The cord being secured at one end in an aperture as at A and passing thru an aperture as at B and obliquely extending thru the other and returning thru an aperture as at C and so on to the point D, this being the other end of the cord, at which point it is firmly attached. The series of cords thus arranged function as a separating means for the panel 5 from the checkered score sheet, by which means a pointed instrument will extend well through the sheet to sever the checkered portion part way around turning the same upward for the purpose later described. The cutting above referred to is performed by a pointed instrument 8 shown in Fig. 5, but I do not wish to be restricted to such alone as other styles of pointed instruments may be used.

To operate the device above described when a test is made by a student, we will assume the following question as answered incorrectly, the question having three possible answers, but only one correct.

Question 1. What is the relative amount of water in a potato?
 1. None.
 2. Small.
 3. Large.

In this instance the student has entered an answer by selecting check No. 3 of Question 1, severing the same on three sides with the instrument, turning it outward as shown in Fig. 1. The upturned portion is blank indicating an incorrect answer.

The following question is answered correctly.

Question 12. Of the following, which one is not miscible with water?
 4. Alcohol.
 5. Glycerine.
 6. Carbon tetrachloride.

In this instance the student has entered an answer by selecting check No. 4 of Question 12, severing the same on three sides with the instrument, turning it upward as shown in Fig. 1. The upturned portion has the mark thereon indicating a correct answer, and so on. Various questions may be arranged for the students whereby they are able to grade themselves with respect to accuracy.

Such modifications may be employed as lie within the scope of the appended claims, and having fully described my invention, what I claim as new and desire to secure by Letters Patent is:—

1. In a self grading device, a score sheet checkered on one side and having indicia on the opposite side of the sheet registering with certain checks selectively.

2. A self grading device of the class described comprising a sheet having one side printed with rows of checks spaced apart and aligned in rows, each row and individual check being numbered, the other side having indicia printed thereon selectively distributed and in registry with certain checks.

3. A self grading device of the class described comprising a sheet having one side printed with rows of checks spaced apart and aligned in rows, each row and individual check being numbered, the other side having indicia printed thereon selectively distributed and in registry with certain checks, and which may be brought into view by cutting around certain checks part way and turning the same upward.

4. In a self grading device, a score sheet checkered on one side and having indicia printed on the opposite side of the score sheet, the checks to be severed part way around and turned upward to reveal the respective indicia, a panel to which the sheet is secured with the score side exposed, means to space the sheet from the panel to permit a pointed severing instrument to extend thru the sheet for severing certain checks part way around.

5. A knowledge testing device of the class described comprising a sheet having two registering pages, one page having lines defining areas, the other page having one or more designating markings registering with respective ones of said defined areas, each of said defined areas adapted to be displaced to expose any marking which may be in registry therewith on the other page.

JOHN A. BROWNLEE.